(12) United States Patent
Cao et al.

(10) Patent No.: US 6,295,396 B1
(45) Date of Patent: Sep. 25, 2001

(54) METHOD AND APPARATUS FOR HIGHER-ORDER CHROMATIC DISPERSION COMPENSATION

(75) Inventors: Xiang-Dong Cao; Fahri Diner, both of Boca Raton, FL (US)

(73) Assignee: Qtera Corporation, Boca Raton, FL (US)

( * ) Notice: Subject to any disclaimer, the term of this patent is extended or adjusted under 35 U.S.C. 154(b) by 0 days.

(21) Appl. No.: 09/326,079

(22) Filed: Jun. 4, 1999

(51) Int. Cl.[7] .............................. G02B 6/34; G02B 6/293
(52) U.S. Cl. ................................. 385/24; 385/37
(58) Field of Search .................... 385/15, 24, 37, 385/123; 359/130

(56) References Cited

U.S. PATENT DOCUMENTS

| | | | |
|---|---|---|---|
| 5,361,319 | | 11/1994 | Antos et al. . |
| 5,410,624 | * | 4/1995 | Morkel ................................. 385/24 |
| 5,677,786 | * | 10/1997 | Meli ................................... 359/341 |
| 5,701,188 | * | 12/1997 | Shigematsu et al. ................ 359/161 |
| 5,943,151 | * | 8/1999 | Grasso et al. ...................... 359/161 |
| 6,122,418 | * | 9/2000 | Ellis .................................. 385/27 |
| 6,222,957 | * | 4/2001 | Lin et al. ............................. 385/24 |

* cited by examiner

Primary Examiner—John D. Lee
Assistant Examiner—Michelle R. Connelly-Cushwa
(74) Attorney, Agent, or Firm—Hunton & Williams

(57) ABSTRACT

An optical arrangement provides dispersion slope compensation to a received dispersion distorted input signal comprising N×M wavelength multiplexed channels. In the optical arrangement, a major dispersion compensating fiber (DCF) provides a first predetermined chromatic dispersion correction value to the N×M wavelength channels. A plurality of fiber Bragg gratings (FBGs) are serially coupled along an optical fiber. Each FBG is arranged to reflect a separate one of N groups of wavelength channels received in the input signal back along the optical fiber in order to provide a second dispersion slope compensating value. Either, the FGBs can chirped to compensate for the dispersion slope within each group of wavelength channels, or each FBG only reflects one group or wavelength channels and small DCFs introduce dispersion slope compensation into the FBG reflected signals. The combination of the first and second dispersion compensating values provided by major DSC and in the reflected signals from the plurality of FBGs, respectively, are used to generate a N×M wavelength multiplexed channel dispersion compensated output signal from the optical arrangement wherein the dispersion found in the input signal is substantially eliminated. A counter-propagating Raman pump signal in the major DCF can also be used to compensate for insertion losses of the FBGs and small DCFs.

33 Claims, 6 Drawing Sheets

METHOD AND APPARATUS FOR HIGHER-ORDER CHROMATIC DISPERSION COMPENSATION

FIELD OF THE INVENTION

The present invention relates to method and apparatus for higher-order chromatic dispersion and dispersion slope compensation for virtually any type of optical fiber used in high-speed optical communication systems.

BACKGROUND OF THE INVENTION

Chromatic dispersion is one of the major sources for signal distortions in high-speed optical communications. For example, OC192 systems (10 Gbit/s Non-Return-to-Zero format) are limited about 70 km for conventional single mode fibers (SMF-28) without compensation for chromatic dispersion. Among a variety of techniques for dispersion compensation, dispersion compensating fibers (DCF) and fiber Bragg gratings (FBG) are the most techniques used in practical applications.

As the demand for bandwidth keeps increasing, the requirements for dispersion compensation also increases. The most efficient way to increase system capacity is to increase the number of channels using the wavelength-division-multiplexing (WDM) technology. However, the existence of higher-order chromatic dispersion in optical fibers makes it difficult to provide chromatic dispersion compensation for all of the channels. The dominating effect of higher-order dispersion is the third-order dispersion, which is also known as the dispersion slope. In other words, dispersion slope describes the different chromatic dispersion that each WDM channel experiences. The broader the optical bandwidth that the WDM channels occupy, or, the longer the transmission distances, the greater the effect of dispersion slope. Therefore, compensation for dispersion slope has become crucial for high capacity WDM systems.

Different types of optical fibers have different dispersion characteristics. In other words, different dispersion slope compensations are required for different fibers. For example, dispersion compensating fibers (DCFs) are considered one of the most reliable techniques for compensating for both dispersion and dispersion slope for the single mode fiber SMF-28. However, it is difficult to design a suitable DCF for dispersion-shifted fibers (DSF) due to the limitations of the optical fiber design. Ideally, fiber Bragg gratings (FBG) are preferable over DCFs for several attractive reasons such as, virtually no optical nonlinearity, low insertion loss, compact size, and flexibility for different fiber types. However, a group-delay ripple associated with an FBG makes it inferior in most applications when compared to a DCF. Therefore, it becomes desirable to provide a technique to compensate for a large amount of chromatic dispersion. Unfortunately, the group-delay ripple also becomes larger for larger amount of chromatic dispersion. Unless the group delay ripple of the FBG can be made small enough, the application of FBGs in dispersion compensation is limited.

It is desirable to provide a technique for higher-order chromatic dispersion and dispersion slope compensation for virtually any type of optical fibers used in high-speed optical communication systems without suffering severe degradation due to a group-delay ripple of fiber Bragg gratings.

SUMMARY OF THE INVENTION

The present invention is directed to method and apparatus for higher-order chromatic dispersion and dispersion slope compensation for virtually any type of optical fiber used in high-speed optical communication systems.

Viewed from one aspect, the present invention is directed to an optical arrangement for providing dispersion slope compensation to a received dispersion distorted input signal comprising N×M wavelength multiplexed channels. The optical arrangement comprises a plurality of N fiber Bragg gratings (FBGs) and first directing means. The plurality of N fiber Bragg gratings (FBGs) are serially coupled along an optical fiber. Each FBG is arranged to reflect a separate one of N groups of wavelength channels received in the input signal back along the optical fiber for providing a dispersion compensating value to each of the N groups of wavelength channels. The first directing means sequentially directs the input signal to the plurality of FBGs for providing dispersion slope compensation to the N×M wavelength multiplexed channels, and then directs a dispersion slope compensated output signal for the N×M wavelength multiplexed channels to an output from the optical arrangement.

Viewed from another aspect, the present invention is directed to an optical arrangement for providing dispersion slope compensation to a received dispersion distorted input signal comprising N×M wavelength multiplexed channels. The optical arrangement comprises first directing means, a plurality of N fiber Bragg gratings (FBGs), and a major dispersion compensating fiber (DCF). The first directing means comprises a first port, a second port, and a third port. The first port is coupled to receive the input signal via a first optical fiber. The second port is coupled to a second optical fiber, and the third port is coupled to a third optical fiber that provides a dispersion slope compensating output signal from the optical arrangement. The directing means directs the input signal from the first port to the second port for propagation along the second optical fiber, and then directs a signal returning on the second optical fiber to the third port for propagation on the third optical fiber. The plurality of N fiber Bragg gratings (FBGs) are serially formed along the second optical fiber. Each FBG is arranged to reflect a separate one of a plurality of N groups of wavelength channels back along the second optical fiber towards the second port of the first directing means for providing a predetermined dispersion compensating value for each of the N groups of wavelength channels. The major dispersion compensating fiber (DCF) is coupled to any one of the first, second, and third optical fibers for providing a predetermined overall dispersion correction value to all of the N×M wavelength channels. The combination of the dispersion compensating values provided by major DCF and in the reflected signals from each of the plurality of FBGs generating a dispersion slope compensated output signal from the optical arrangement wherein dispersion found in the input signal is substantially eliminated.

Viewed from still another aspect, the present invention is directed to a method of providing dispersion slope compensation to a received dispersion distorted input signal comprising N×M wavelength multiplexed channels comprising the following steps. In step (a), a separate one of N groups of wavelength channels is reflected back along an optical fiber from a separate one of a plurality of N fiber Bragg gratings (FBGs) which are serially coupled along the optical fiber for providing a first dispersion compensating value to each of the N groups. In step (b), a predetermined overall second dispersion compensating value is introduced to the N×M wavelength multiplexed channels by a major dispersion compensating fiber (DCF). In step (c), a dispersion slope compensated output signal is generated wherein the dispersion in the input signal is substantially eliminated after the N groups of wavelength signals have been reflected by each of the plurality of FBGs in step (a) and have propagated through the major DCF in step (b) to an output.

Viewed from still another aspect, the present invention is directed a method of providing dispersion slope compensation to a received dispersion distorted input signal comprising N×M wavelength multiplexed channels comprising the following steps. In step (a), the N×M wavelength multiplexed channels are demultiplexed in a band separator into a plurality of N groups of M wavelength channels each. A first section of the N groups of wavelength channels are directed along a first optical fiber, and a second section of the N groups of wavelength channels are directed along a second optical fiber. In step (b), each of groups of wavelength channels received in the first and second sections via the first and second optical fibers, respectively, are directed along a respective third and fourth optical fiber. In step (c), a separate one of the groups of wavelength channels is reflected back along the third and fourth optical fibers, respectively, from a separate one of a respective first and second plurality of fiber Bragg gratings (FBGs) which are serially coupled along each of the third and fourth optical fibers, respectively, for introducing a separate first dispersion compensating value into each of the groups of wavelength channels in the respective first and second sections. In step (d), a predetermined overall separate second dispersion compensating value is introduced to the groups of wavelength channels in the first and second section when propagating through a first and second major dispersion compensating fiber (DCF), respectively. In step (e), first and second output signals are generated after the groups of wavelength channels in the first and second sections, respectively, have been reflected by predetermined ones of the FBGs in step (c) and propagated through the respective first and second major DCFs in step (d). In step (f), the first and second output signals generated in step (e) are multiplexed to generate an output signal comprising the N×M dispersion slope compensated wavelength multiplexed channels.

The invention will be better understood from the following more detailed description taken with the accompanying drawings and claims.

The drawings are not necessarily to scale.

DETAILED DESCRIPTION

Figure 1:
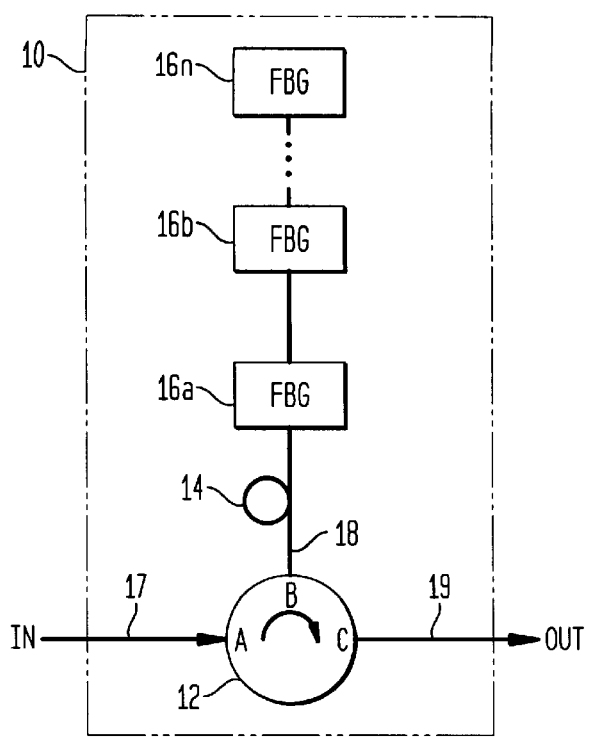
FIG. 1 is a block diagram of a dispersion slope compensating arrangement in accordance with a first embodiment of the present invention.

Referring now to FIG. 1, there is shown a block diagram of an optical dispersion slope compensating arrangement 10 (shown within a dashed line rectangle) in accordance with a first embodiment of the present invention. The dispersion slope compensating arrangement 10 comprises an optical circulator 12, a major dispersion compensating fiber (DCF) 14, and a plurality of N fiber Bragg gratings (FBG) (of which only FBGs 16a, 16b, and 16n are shown). The optical circulator 12 is shown as comprising three ports A, B, and C. The major DCF 14 and the plurality of N fiber Bragg gratings 16a–16n are serially coupled along an optical fiber 18 which is coupled at one end to Port B of the optical circulator 12. An optical input fiber 17 and an optical output fiber 19 are coupled at one end thereof to ports A and C, respectively, of the optical circulator 12.

In operation, a dispersion distorted optical input signal is received by the optical dispersion slope compensating arrangement 10 via the optical input fiber 17, and is coupled to Port A of the optical circulator 12. The optical input signal comprises N×M wavelength multiplexed channels which are subsequently grouped into N groups with M wavelength channels per group. The optical circulator 12 directs the optical input signal to port B thereof which directs the optical input signal onto optical fiber 18 and to the serial arrangement of the major DCF 14 and the plurality of N FBGs 16a to 16n. The major DCF 14 introduces a predetermined chromatic dispersion correction during two passages therethrough of the N groups of wavelength channels. Each of the plurality of FBGs 16a–16n is designed to introduce a predetermined dispersion slope compensation value which compensates for the dispersion of only one specific group of wavelength channels of the N groups of wavelength channels received in the optical input signal. All of the FBGs 16a–16n are used in a reflection mode. In other words, each group of M channels is reflected back upon reaching its own designated one of the plurality of N FBGs 16a–16n that has been designed to reflect the wavelength channels within that group. Therefore, all of the N groups of M wavelength channels will be individually reflected by the plurality of FBGs 16a–16n for a second passage through the major DCF 14 in propagating back to port B of the optical circulator 12 with their dispersion distortion corrected. Finally, the dispersion slope compensated signals are directed from port B to port C of the optical circulator 12. The inclusion of the major DCF 14 is optional depending on the application. More particularly, if only dispersion slope compensation is required, then the major DCF 14 is not required, since the major DCF 14 is used to compensate for an average chromatic dispersion while the FBGs 16a–16n compensate for dispersion slope. Alternatively, if both the average dispersion and the dispersion slope are required to be compensated for, then it is necessary to use the major DCF 14 with the plurality of FBGs 16a–16n. The location of the major DCF 14 can be positioned near any one of the ports A, B or C of the optical circulator 12. More particularly, the major DCF 14 can be placed either (a) in the optical fiber 17 near the input port A, (b) in the optical fiber 18 near the Port B (as is shown in FIG. 1), or in the optical fiber 19 near the output port C.

The availability of the components, as well as the limitation of the overall system design determine the exact partitioning of the total optical bandwidth into N subgroups with M channels per subgroup. The flexibility of the design of the optical dispersion slope compensating arrangement 10 makes it possible to compensate for a variety of fiber types. Since there is no broad-band DCF available for dispersion-shifted fibers, an example is presented here to illustrate the principles of slope compensation. The same concept is also valid for other fiber types such as the single mode fiber SMF-28.

The basic design of the optical dispersion compensating arrangement 10 described above equalizes the dispersion slope among different groups of wavelength channels, but not dispersion slope within each group of wavelength channels. In practice, it is possible to reduce the number of wavelength channels in each group if the dispersion difference within each group is too large. Since the optical bandwidth for each group of wavelength channels is relatively small, it is possible to use quadratically chirped FBGs 16a–16n so that the dispersion difference within every wavelength band is equalized. The optical design of such arrangement is similar to the optical dispersion compensating arrangement 10 except that the FBGs 16a–16n are no longer linearly chirped. Instead, the FBGs 16a–16n are quadratically chirped to compensate for the dispersion slope within each group of wavelength channels.

Figure 2:
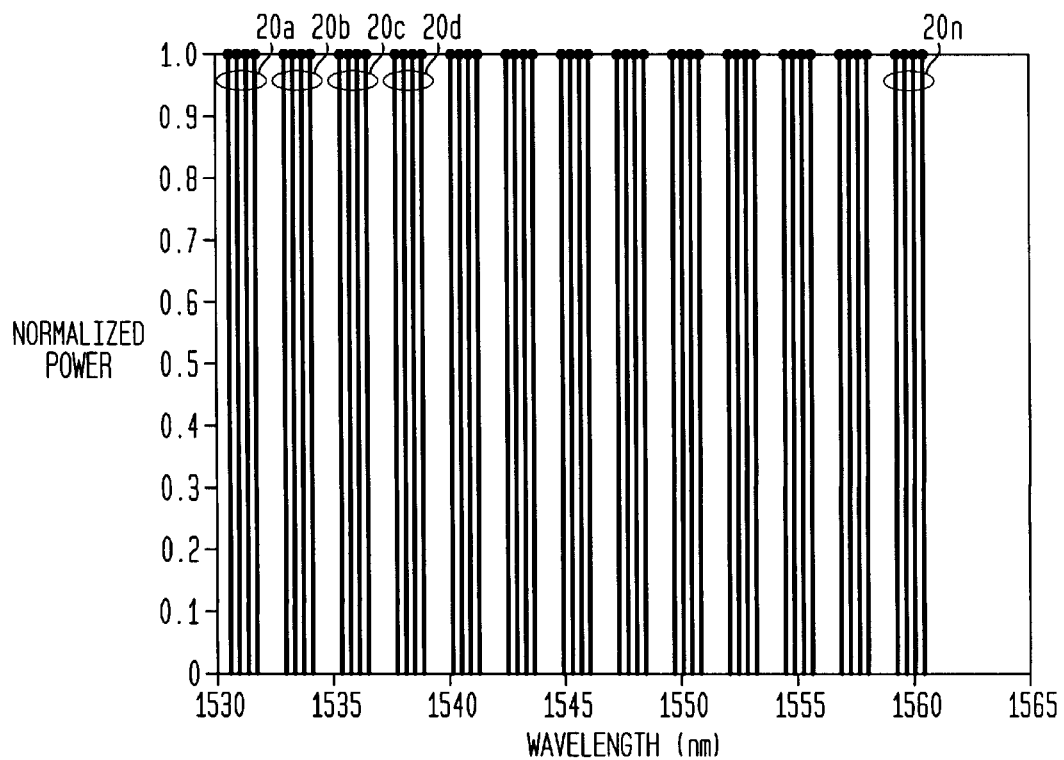
FIG. 2 graphically shows fifty-two exemplary wavelength multiplexed channels grouped into thirteen groups of four wavelength channels each for dispersion slope compensation in the arrangement of FIG. 1.

Referring now to FIG. 2, there is graphically shown N×M wavelength multiplexed channels grouped into N groups with M channel per group for dispersion slope compensation in the optical dispersion slope compensating arrangement 10 of FIG. 1, where N and M can be any integer. More particularly, fifty-two (N×M=52) exemplary wavelength multiplexed channels are formed into N groups (where N=13) designated 20a–20n (where only groups 20a–20d, and 20n are labeled) of M wavelength channels each (where M=4). The horizontal axis represents wavelength in nanometers between 1530 and 1565 nanometers (nm), and the vertical axis represents normalized power between 0 and 1. For example, a first group 20a of four wavelength channels lies between approximately 1530.7 and 1531.9 nanometers, while a second group 20b of four other wavelength channels lies between approximately 1533 and 1534.2 nanometers, etc. The separations between channels at different wavelengths within each group is an exemplary 0.4 nm (50 GHz). In the optical dispersion slope compensating arrangement 10 of FIG. 1, the first group 20a of four wavelength channels are associated with, for example, FBG 16a while the second group 20b of four wavelength channels are associated with FBG 16b, etc.

Figure 3:
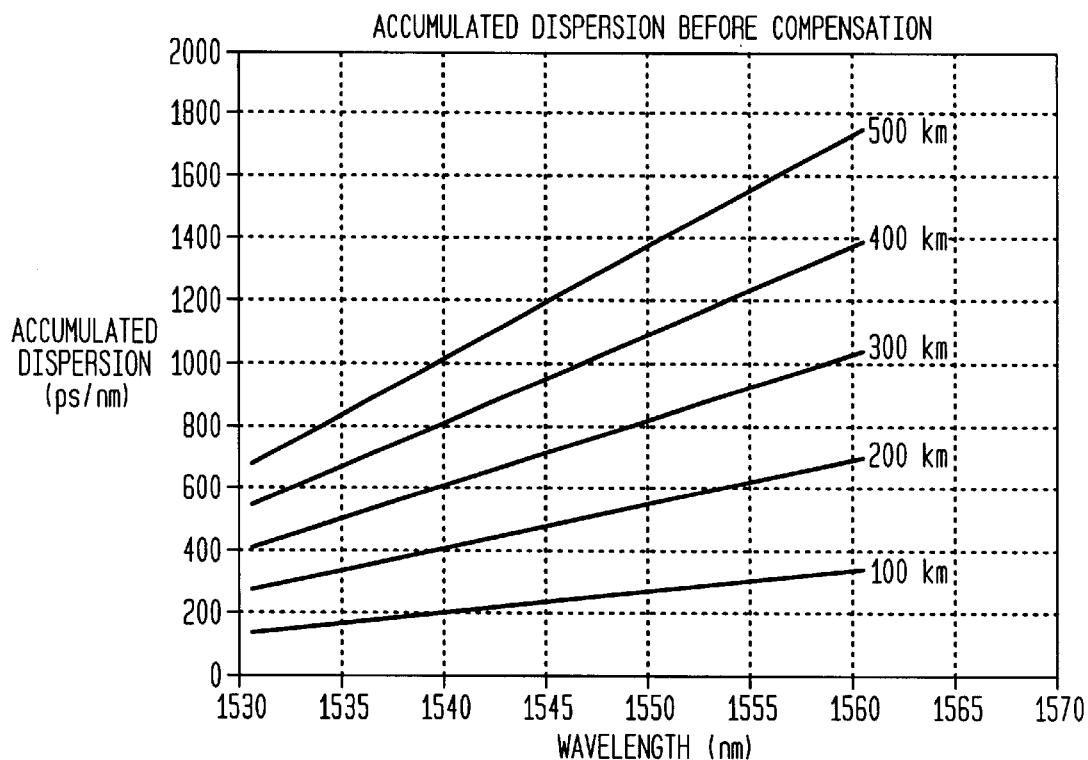
FIG. 3 graphically shows exemplary accumulated dispersions before any compensation for different transmission distances and wavelengths are made.

Referring now to FIG. 3, there is graphically shown exemplary accumulated dispersions before any compensation for different transmission distances (100–500 km) and wavelengths (1530–1570 nm) for an exemplary fiber. The horizontal axis represent wavelength in nanometers between 1530 and 1570 nanometers (nm), and the vertical axis represents accumulated dispersion between 0 and 2000 picoseconds/nanometer (ps/nm) for the exemplary fiber. Curves similar to those shown in FIG. 3 are obtainable for any specific optical fiber that is commercially available and used for the optical fibers 17, 18, and 19 in FIG. 1.

Figure 4:
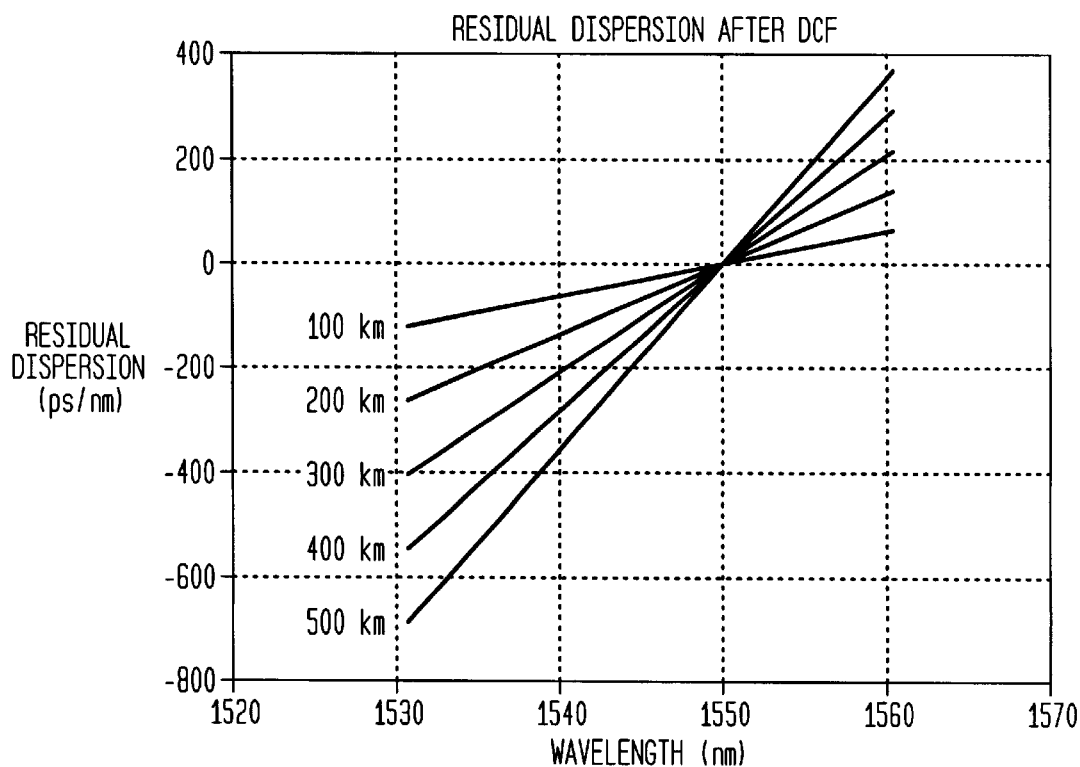
FIG. 4 graphically shows exemplary accumulated residual dispersions after compensation by a dispersion compensating fiber (DCF) for different transmission distances and wavelengths.

Referring now to FIG. 4, there is graphically shown exemplary accumulated residual dispersions found after compensation by only the major dispersion compensating fiber (DCF) 14 shown in FIG. 1 for different transmission distances and wavelengths. The horizontal axis represent wavelength in nanometers between 1520 and 1570 nanometers (nm), and the vertical axis represents residual dispersion between −600 and +400 picoseconds/nanometer (ps/nm) for an exemplary fiber. In FIG. 4, there is seen that there are different residual dispersions for different wavelength groups as well as for different transmission distances. Using the FBGs 16a–16n of FIG. 1 with proper amounts of slope dispersion compensations will equalize the final dispersions for all of the groups of wavelength channels. In accordance with the present invention, the final average slope dispersions for each group (a–n) of wavelength channels is equalized to 0 ps/nm by the associated ones of FBGs 16a–16n and the major DCF 14. Required dispersion values for each of groups a, b, and n at different transmission distances for an exemplary fiber is listed in Table I.

TABLE I

| wavelength | GRP | 100 km | 200 km | 300 km | 400 km | 500 km |
| --- | --- | --- | --- | --- | --- | --- |
| 1530.7–1531.9 | a | 121 | 242 | 364 | 485 | 606 |
| 1533.1–1534.2 | b | 106 | 212 | 318 | 424 | 530 |
| 1559.4–1560.6 | n | −64 | −129 | −194 | −259 | −324 |

If FBGs 16a, 16b, and 16n of FIG. 1 are associated with the groups a, b, and c, respectively, and the transmission distance for the exemplary fiber is 100 km, then the FBGs 16a, 16b, and 16n are required to provide slope dispersions of 121 ps/nm, 106 ps/nm, and −64 ps/nm, respectively, to equalize the groups a, b, and n of wavelength channels to 0 ps/nm.

Figure 5:
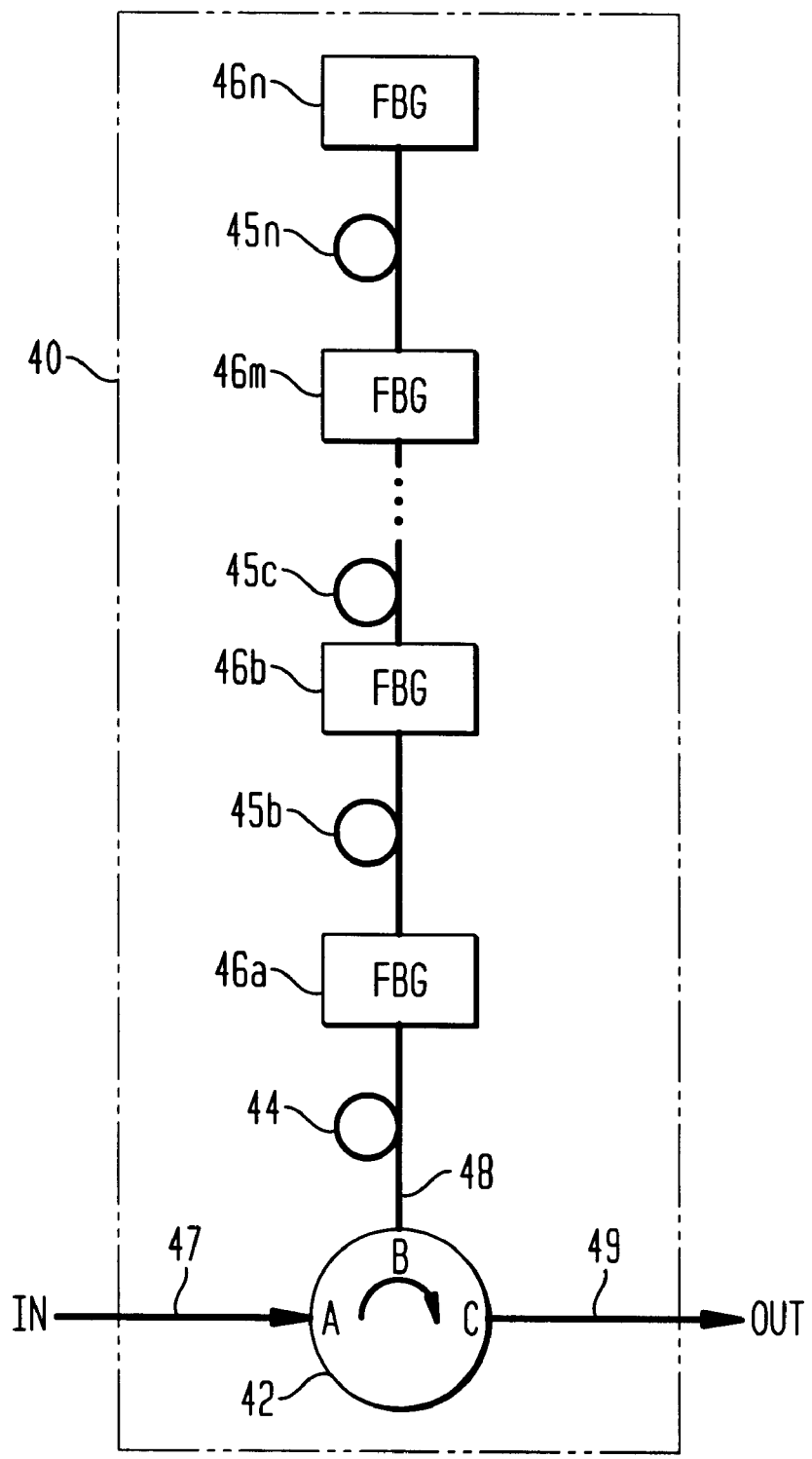
FIG. 5 is a block diagram of an optical dispersion slope compensating arrangement in accordance with a second embodiment of the present invention.

Referring now to FIG. 5, there is shown a block diagram of an optical dispersion slope compensating arrangement 40 (shown within a dashed line rectangle) in accordance with a second embodiment of the present invention. The optical dispersion slope compensating arrangement 40 comprises an optical circulator 42, a major dispersion compensating fiber (DCF) 44, a plurality of N fiber Bragg gratings (FBG) (of which only FBGs 46a, 46b, and 46n are shown), and a plurality of N−1 small DCFs (of which only small DCFs 45b 45c, and 45n are shown). The optical circulator 42 comprises three ports A, B, and C. An optical input fiber 47 and an optical output fiber 49 have one end thereof coupled to ports A and C, respectively, of the optical circulator 42. The major DCF 44 is shown coupled adjacent to port B of the optical circulator 42 in an optical fiber 48, and the plurality of N fiber Bragg gratings 46a–46n and the plurality of N−1 small DCFs 45b–45n are then alternately coupled along the optical fiber 48.

In accordance with the second embodiment, the FBGs 46a–46n do not have any chirp and, therefore, provide zero chromatic dispersion and serve only as band reflectors. More particularly, each of the FBGs 46a–46n functions to only reflect one of a plurality of groups of N wavelength bands (e.g., group 20a, 20b, 20c, 20d, or 20n shown in FIG. 2) in a received distorted optical input signal without introducing extra dispersion compensation as occurs with the FBGs 16a–16n in the optical dispersion compensating arrangement 10 of FIG. 1. The required dispersion compensation for each group of wavelength channels is provided by the additional small DCFs 45b–45n alternately sandwiched between the FBGs 46a–46n instead of by the chirped FBGs 16a–16n of FIG. 1. The optical signals pass predetermined ones of the DCFs 45b–45n twice, once in the upward direction and then in the downward direction after reflection by the associated FBG 46a–46n. Therefore, the required amount of slope dispersion compensation to be provided by each of the DCFs 45b–45n is equal to one-half of the dispersion difference between each adjacent group of wavelength channels. For the exemplary groups of wavelength channels shown in FIG. 2, the lengths of the optical fibers forming the small DCFs 45b–45n are the same because the groups of wavelength channels have equal separations. Still further, the location of the major DCF 44 is flexible, as it can be located adjacent to any one of the three ports A, B or C of the optical circulator 42.

In operation, a distorted optical input signal is received by the optical dispersion slope compensating arrangement 40 via the optical input fiber 47, and is coupled to Port A of the optical circulator 42. The optical input signal comprises an exemplary N×M wavelength multiplexed channels which are subsequently arranged into N groups with M channel per group as shown, for example, in FIG. 2. The optical circulator 42 directs the optical input signal out of port B thereof onto optical fiber 48 and the serial arrangement of the major DCF 44, and the alternating arrangement of each of the plurality of N FBGs 46a–46n and the small DCFs 45b–45n. The major DCF 44 provides a predetermined chromatic dispersion compensation value over the exemplary N×M wavelength multiplexed channels so that a predetermined wavelength has a dispersion of zero ps/nm. In FIG. 4, the major DCF 44 is shown as compensating for dispersion at a wavelength of 1550 nm for each of the 100–500 km distances. However, it is assumed hereinafter that the major DCF 44, compensates for dispersion at a wavelength of approximately 1531 nm which is associated with the lowest wavelength group (group 20a in FIG. 2). As a result, if FIG. 4 were redrawn, each of the linear curves would have a same slope but would have a zero residual dispersion value at approximately 1531 nm instead of at 1550 nm.

Each of the plurality of FBGs 46a–46n is used in only a reflection mode and does not introduce dispersion slope compensation. As a result, each group (e.g., group 20a, 20b, or 20c, etc. of FIG. 2) of M wavelength channels of the plurality of N groups is reflected back when reaching its associated separate corresponding one of the plurality of N FBGs 46a–46n. For example, the N groups of wavelength channels propagate upward in optical fiber 48 through the major DCF 42. A first group 20a (shown in FIG. 2) of M wavelength channels lying between approximately 1530.7 and 1531.9 nanometers is reflected by the FBG 46a. After a second pass of the first group 20a of M wavelength channels through the major DCF 44, the first group 20a of M wavelength channels have a residual dispersion value of zero ps/nm. The remaining second (20b) to N (20n) groups of wavelength channels are not reflected by FBG 46a and propagate further up the optical fiber 48 and are reflected by the corresponding one of the FBGs 46b–46n, respectively.

The small DCFs 45b–45n each provide dispersion slope compensation value of one-half the dispersion difference between each group of wavelength bands. In other words, the required amount of dispersion provided by each of the DCFs 45b–45n is equal to one-half of the dispersion difference between, for example, the first group 20a and the second group 20b of M wavelength channels. More particularly, the small DCF 45b provides one-half of the residual dispersion difference between the zero ps/nm for the first group of M wavelength channels and the residual dispersion for the second group 20b as can be determined from the slope of the linear curve for the specific distance shown in FIG. 4. Since the curve of residual dispersion after compensation by major DCF 42 is linear, each of the small DCFs 45b–45n can be designed to provide a same dispersion compensation value. Still further, each one of the N groups of wavelength channels passes twice through each of the small DCFs 45b–45n that are below the FBG 46b–46n that reflects a particular group of M wavelength channels. More particularly, the small DCF 45b provides a same amount of dispersion compensation for each of the second to N groups of M wavelength channels passing therethrough in either direction up or down the optical fiber 48. When considering a linear curve for residual dispersion that has a residual dispersion of zero ps/nm at a wavelength of 1531 nm, the second group 20b of wavelength channels passes twice through only the small DCF 45b and will have a residual dispersion value of zero ps/nm. Similarly, a third group 20c of wavelength channels is reflected by a FBG 46c (not shown) and passes twice through each of the small DCFs 45c and 45b to provide twice the dispersion difference provided by only one small DCF resulting in a residual dispersion at zero ps/nm for the third group of M channels. Still further, the Nth group 20n of wavelength channels is reflected by the FBG 46n and passes twice through each of small DCFs 45b–45n to provide N–1 times the dispersion difference provided by only one small DCF resulting in a residual dispersion at zero ps/nm for the Nth group 20n of wavelength channels. By having equally spaced groups of M channels and a linear residual dispersion curve after the major DCF 42, each of the small DCFs 45b–45n can provide a same amount of dispersion slope compensation to permit the small DCFs 45b–45n to generate a predetermined cumulative dispersion slope compensation value for each of the N groups of wavelength channels. This technique results in a zero ps/nm dispersion across the N groups in conjunction with the chromatic dispersion correction provided by major DCF 42. Once the N groups of wavelength channels return to port B of the circulator 42, the circulator 42 directs the N×M wavelength multiplexed channels to port C and out of the optical dispersion slope compensating arrangement 40 via the optical fiber 49.

The optical dispersion slope compensating arrangement 40 can also be modified to improve a total insertion loss. Normally the optical fibers used in writing the FBGs 46a–46n are different from the optical fibers used for the DCF 45b–45n, which results in mode-mismatch when splicing these two kinds of fibers together. As a consequence of this mode-mismatch, higher coupling/splicing loss will be present. One way to eliminate this extra loss is to use the same fiber types for both the small DCFs 45b–45n and FBGs 46a–46n. Therefore, it is desirable to use a single piece of a DCF for the overall length of the optical fiber 48, and write gratings on it between every designated length of the DCF 45b–45n (194 m for the example given hereinbefore). In this manner, all of the splicing losses can be eliminated.

Figure 6:
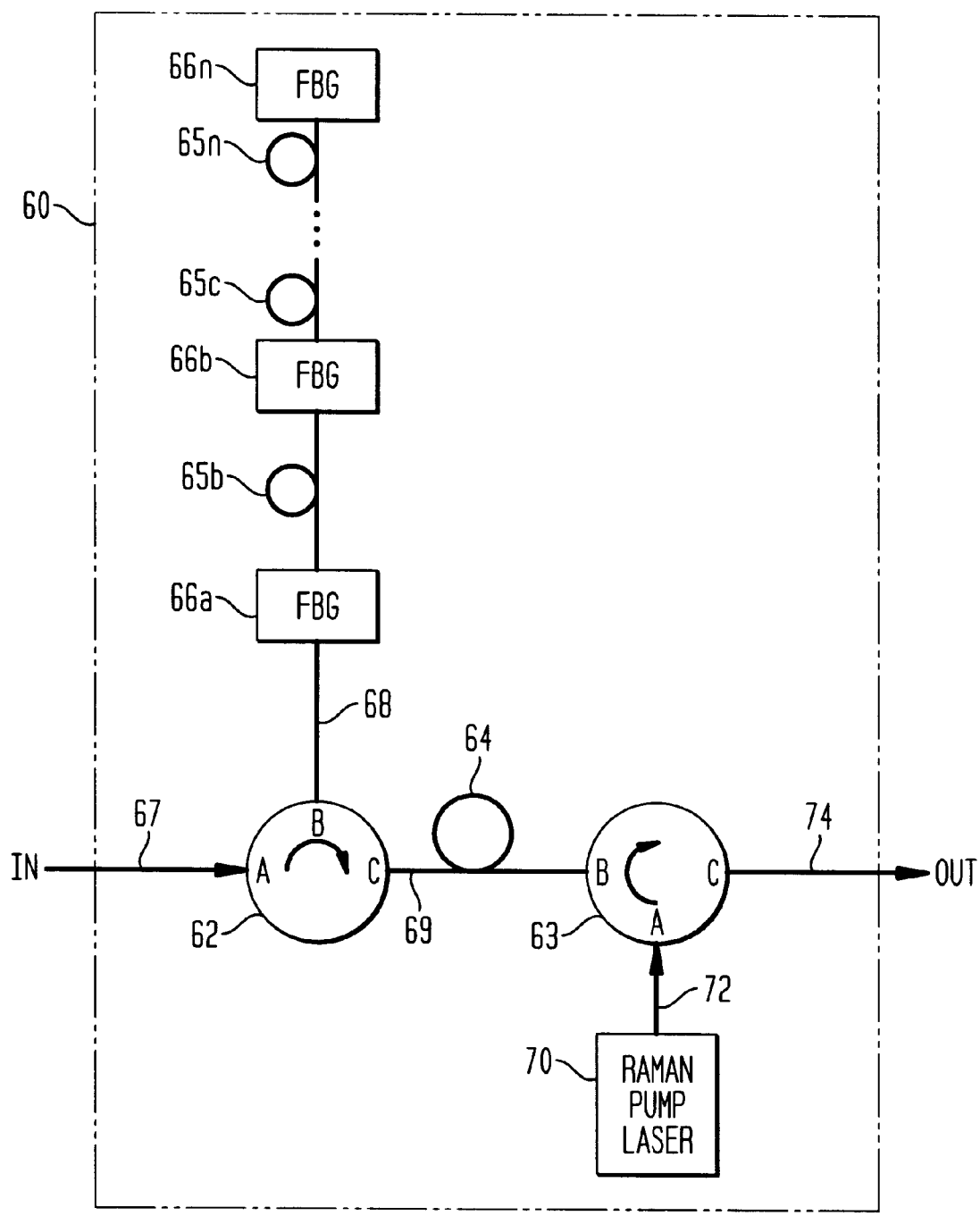
FIG. 6 is a block diagram of an optical dispersion slope compensating arrangement with Raman amplification in accordance with a third embodiment of the present invention.

Referring now to FIG. 6, there is shown a block diagram of an optical dispersion slope compensating arrangement 60 (shown within a dashed line rectangle) with Raman amplification in accordance with a third embodiment of the present invention. The optical dispersion slope compensating arrangement 60 comprises a first optical circulator 62, a second optical circulator 63, a major dispersion compensating fiber (DCF) 64, a plurality of N fiber Bragg gratings (FBG) 66a–66n (of which only FBGs 66a, 66b, and 66n are shown), a plurality of N–1 small DCFs (of which only small DCFs 65b, 65c, and 65n are shown), and a Raman pump laser 70. The first and second optical circulators 62 and 63 each comprises three ports A, B, and C. An optical input fiber 67 and an optical output fiber 69 are coupled to ports A and C, respectively, of the first optical circulator 62. The major DCF 64 is coupled in the optical fiber 69 between ports C and B of the first and second optical circulators 62 and 63, respectively. The plurality of N fiber Bragg gratings 66a–66n and the plurality of N–1 small DCFs 65b–65n are alternately coupled along the optical fiber 68 which is coupled at one end thereof to port B of the first optical circulator 62. The major DCF 64, the plurality of N fiber Bragg gratings 66a–66n, and the plurality of N–1 small DCFs 65b–65n function in the same manner as described hereinabove for the major DCF 44, the plurality of N fiber Bragg gratings 46a–46n, and the plurality of N–1 small DCFs 45b–45n shown in FIG. 5 to provide dispersion compensation. The major DCF 64 is shown coupled to port C of the first optical circulator 62 instead of port B as is shown in FIG. 5. However, it is to be understood that the major DCF 64 can be coupled to any one of the ports A, B, or C of the first optical circulator 64 and still provide the correct chromatic dispersion compensation to, for example, bring the curves to a zero ps/nm dispersion value at 1531 nm in the curves of FIG. 4. The Raman pump laser 70 is coupled to port A of the second circulator 63 via an optical fiber 72, and an output optical fiber 74 from the arrangement 60 is coupled to port C of the second circulator 63.

In operation, a distorted optical input signal is received by the optical dispersion slope compensating arrangement 60 via the optical input fiber 67, and is coupled to Port A of the first optical circulator 62. The optical input signal comprises an exemplary N×M wavelength multiplexed channels which is subsequently arranged into N groups 20a–20n with M channel per group as shown, for example, in FIG. 2. The first optical circulator 62 directs the optical input signal from port A and out of port B thereof onto optical fiber 68 and the alternating serial arrangement of the plurality of N FBGs 66a–66n and the plurality of N–1 small DCFs 65b–65n. The plurality of N FBGs 66a–66n and the N–1 small DCFs 65b–65n function as described for the FBGs 46a–46n and the small DCFs 45b–45n in FIG. 5 to provide dispersion slope compensation. The dispersion compensated signal returning to port B of the first circulator 62 from the optical fiber 68 is directed to port C thereof and to the major DCF 64. The major DCF 64 provides the remaining chromatic dispersion compensation so that all of the N wavelength groups have a zero residual dispersion at the output of the major DCF 64.

The major DCF 64 has a high Raman gain coefficient due to its small core size. It is possible to use this fact to compensate for the insertion loss by using a counter-propagating Raman pump laser 70. Since the total Raman gain depends on the length of the major DCF 64, it is necessary to couple the major DCF 64 to the port A or the Port C of the first circulator 62 instead of to port B (as shown in FIG. 5). Using a counter-propagating configuration of the Raman pump signal through the major DCF 64 eliminates the cross-talk between Wavelength Division Multiplexed (WDM) channels mediated by the Raman effect. The Raman pump laser 70 can be coupled into the major DCF 64 by using either a wavelength multiplexer, or a second circulator 63 (as is shown in FIG. 6). Since Raman gain is polarization dependent, it is necessary either to depolarize the Raman pump laser 70, or to use two Raman pumps (not shown) with their polarization states orthogonal to each other before being coupled into the major DCF 64. The wavelengths of Raman pump lasers are about 80–100 nm down-shifted from the input signal wavelengths, which is typically around 1480 nm.

The output Raman pump signal from the Raman pump laser 70 is received at port A of the second circulator 63 and directed out of Port B thereof for propagation on optical fiber 69 through the major DCF 64. Normally the major DCF 64 is a long section of a dispersion compensating fiber (DCF), and the Raman pump signal is generally absorbed in the DCF 64 in substantially eliminating any crosstalk between wavelength channels. Any remaining Raman pump signal that may reach the first circulator 62 on optical fiber 69 is blocked by the first circulator 62 from reaching either the input optical fiber 67 or the optical fiber 68. A dispersion and crosstalk compensated signal from the major DCF 64 arrives at port B of the second circulator 63 and is directed out of port C thereof as an output signal from the optical dispersion slope compensating arrangement 60.

Figure 7:
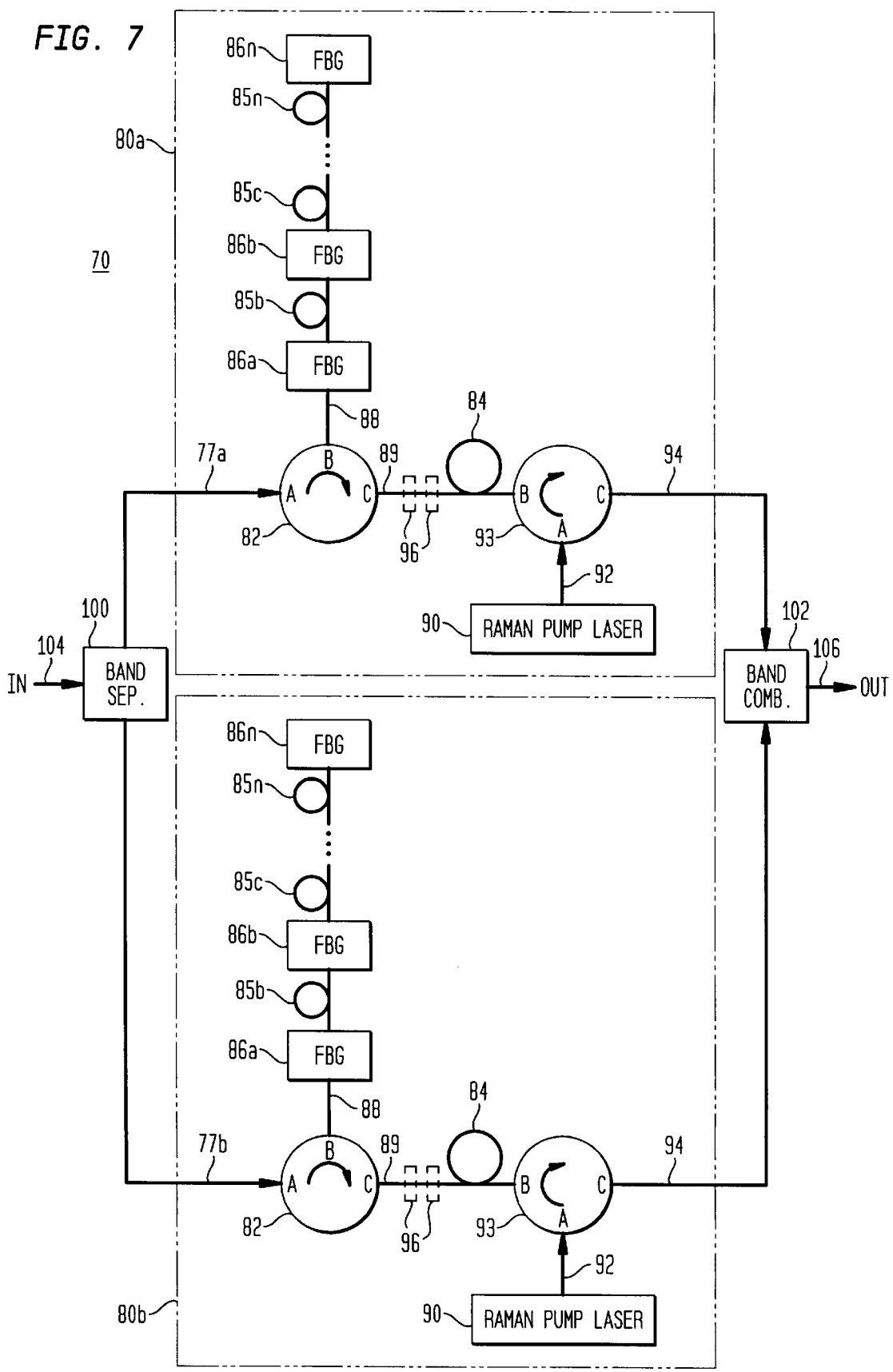
FIG. 7 is a block diagram of an optical dispersion slope compensating arrangement for small wavelength band separations in accordance with a fourth embodiment of the present invention.

Referring now to FIG. 7, there is shown a block diagram of an optical dispersion slope compensating arrangement 70 for small group wavelength band separations in accordance with a fourth embodiment of the present invention. The optical dispersion slope compensating arrangement 70 comprises a first optical dispersion slope compensating device 80a (shown within a dashed line rectangle), a second optical dispersion slope compensating 80b (shown within a dashed line rectangle), a wavelength band separator (BAND SEP.) 100, and a wavelength band combiner (BAND COMB.) 102. Each of the first and second optical dispersion slope compensating devices 80a and 80b comprise a first circulator 82, a major dispersion compensating fiber (DCF) 84, a plurality of N–1 small DCFs 85b–85n, a plurality of N fiber Bragg gratings (FBGs) 86a–86n, a Raman pump laser 90, and a second circulator 93. Each of the first and second optical dispersion slope compensating devices 80a and 80b correspond in structure and operation to that described hereinbefore for the optical dispersion slope compensating arrangement 60 of FIG. 6. Therefore, such description of the structure and operation of the first and second optical dispersion slope compensating devices 80a and 80b is not be repeated here.

The optical dispersion slope compensating arrangement 70 is designed to provide dispersion and dispersion slope compensation where the wavelength separations between wavelength groups is relatively small compared to the isolation capability of the FBGs 86a–86n. It is possible to separate the N groups of wavelength channels into first and second sections comprising, for example, the odd numbered groups and the even numbered groups, respectively. Therefore, the separations of the groups of wavelength channels in each of the first and second sections are twice the original separations in the N groups of wavelength channels from those used in, for example, the optical dispersion slope compensating arrangement 60 of FIG. 6. More particularly, the input N groups (20a, 20b, 20c, 20d, etc.) of wavelength channels shown, for example, in FIG. 2 are separated into the exemplary odd groups (20a, 20c, 20e, etc.) and the even groups (20b, 20d, 20f, etc.) by the band separator 100, which can be, for example, a Mach-Zehnder interferometer based filter. Then the odd numbered and the even numbered groups of wavelength channels are coupled to the first and second optical dispersion slope compensating devices 80a and 80b, respectively, via respective optical fibers 77a and 77b. The first and second optical dispersion slope compensating devices 80a and 80b can be any one of the designs of the optical dispersion slope compensating arrangements 10, 40, or 60 described hereinbefore, and the dispersion slope compensating arrangement 60 of FIG. 6 is shown for each of the optical dispersion slope compensating devices 80a and 80b only as an example. After the input signal has been compensated to correct for chromatic dispersion and dispersion slope in each of the optical dispersion slope compensating devices 80a and 80b, the odd and even numbered groups of wavelength channels are then combined together in the band combiner 102 and coupled to an output fiber 106. It is also possible to optionally use first and second 50:50 (3 dB) power splitters in place of the band separator 100 and the band combiner 102. However, with such power splitters, additional clean-up notch filters 96 (shown as dashed line rectangles) in each of the first and second optical dispersion slope compensating devices 80a and 80b are required to perform the separation of the groups of wavelength channels into first and second sections. By using 50:50 power splitter, both the odd and even numbered groups of wavelength channels are present in both outputs of the first 3 dB coupler (used in place of the band separator 100) and propagate on optical fibers 77a and 77b. Therefore, it is necessary to filter out the even numbered groups of wavelength channels in the first optical dispersion slope compensating device 80a, and the odd numbered groups of wavelength channels in the second optical dispersion slope compensating device 80b to prevent multi-path interference. A separate notch filter 96 is needed to pass the appropriate ones of the odd or even numbered groups of wavelength channels and block the even or odd numbered groups in the first and second optical dispersion slope compensating device 80a and 80b, respectively.

At this point it should be noted that optical fibers 88, 89, 92, 94, and 104 function to carry optical signals in a manner similar to that described above.

Figure 8:
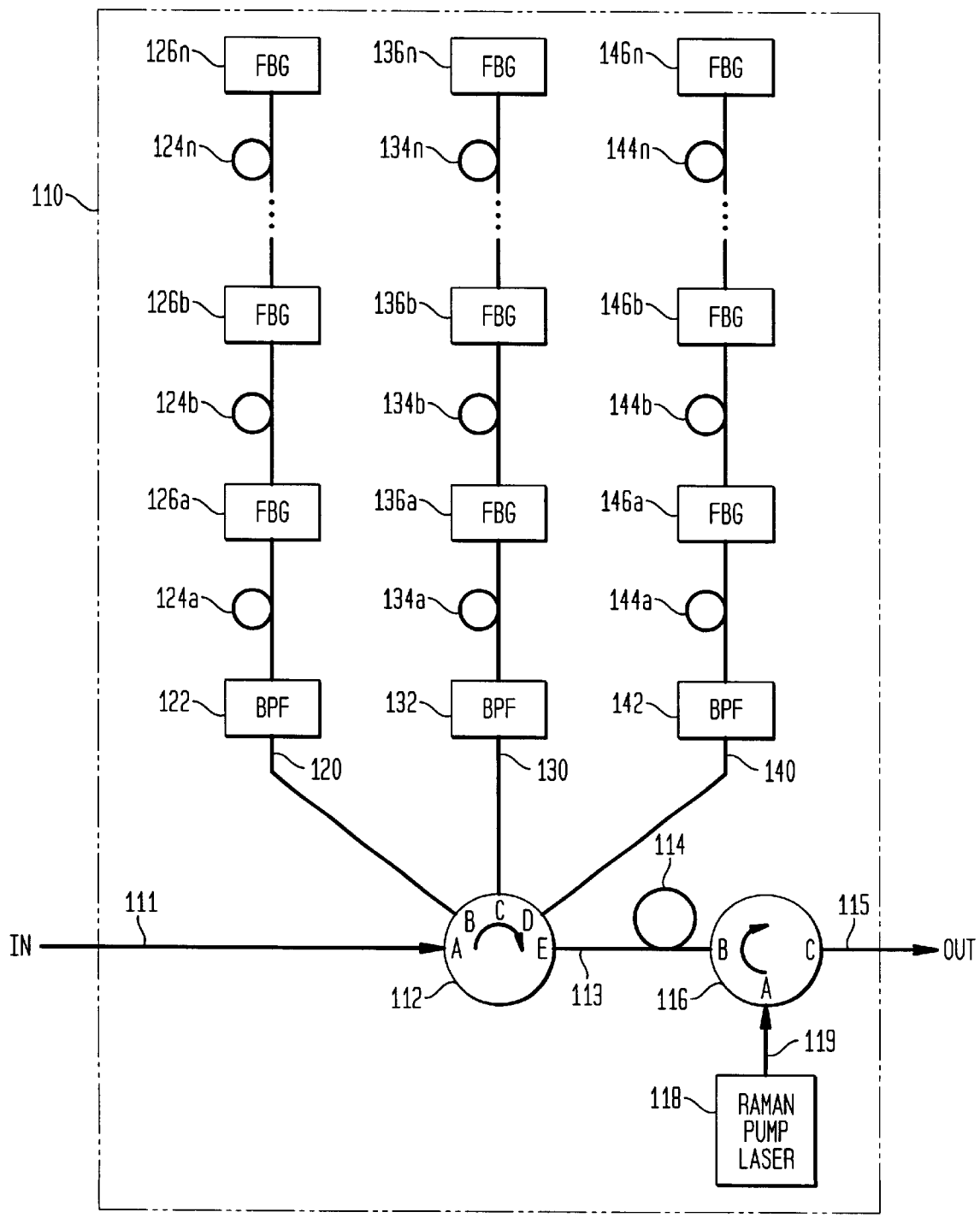
FIG. 8 is a block diagram of an optical dispersion slope compensating arrangement with uniform power loss over wavelength bands in accordance with a fifth embodiment of the present invention.

Referring now to FIG. 8, there is shown a block diagram of an optical dispersion slope compensating arrangement 110 (shown within a dashed line rectangle) with a uniform power loss over large groups of wavelength channels in accordance with a fifth embodiment of the present invention. The optical dispersion slope compensating arrangement 110 comprises a first circulator 112, a major dispersion compensating fiber (DCF) 114, a second circulator 116, a Raman pump laser 118, first, second, and third band-pass filters 122, 132, and 142, a first plurality of small DCFs 124a–124n alternately coupled to a first plurality of fiber Bragg gratings 126a–126n in an optical fiber 120, a second plurality of small DCFs 134a–134n alternately coupled to a second plurality of fiber Bragg gratings 136a–136n in an optical fiber 130, and a third plurality of small DCFs 144a–144n alternately coupled to a third plurality of fiber Bragg gratings 146a–146n in an optical fiber 140. The first circulator 112 comprises, for example, five ports A, B, C, D, and E, and the second circulator 116 comprises three ports A, B, and C. An input fiber 111 is coupled to deliver a dispersion distorted input signal to port A of the first circulator 112. The optical fibers 120, 130, and 140 are coupled at one ends thereof to ports B, C, and D, respectively, of the first circulator 112, and an optical fiber 113 is coupled between port E of the first circulator 112 and port B of the second circulator 116. The major DCF 114 is formed in the optical fiber 113. The Raman pump laser 118 is coupled to port A of the second circulator 116 via an optical fiber 119, and port C of the second circulator 116 provides an output signal from the optical dispersion slope compensating arrangement 110 via an optical fiber 115.

The optical dispersion slope compensating arrangement 110 is designed for situations in which the number of groups (N) of wavelength channels (M) of the input signal becomes very large. More particularly, there will be a significant power difference among all of the groups of wavelength channels due to insertion and splicing losses of the DCFs 124a–124n, 134a–134n, and 144a–144n and the FBGs 126a–126n, 136a–136n, and 146a–146n if they were all formed in a single optical fiber in the manner shown in, for example, in the dispersion slope compensating arrangements 10, 40 or 60 shown in FIG. 1, 5, or 6, respectively. The multi-port first circulator 112 is used to solve the problem associated with power non-uniformity.

In operation, a distorted input signal that is received on optical fiber 111 is coupled to Port A of the first circulator 112, and then directed to Port B. The first band-pass filter 122, connected to Port B via optical fiber 120, is used to pass predetermined ones of the groups of wavelength channels, and reflects the remaining groups of wavelength channels back to Port B which are then directed to Port C of the first circulator 112. As for the groups of wavelength channels that pass through the first band-pass filter 122, their dispersion slope can be compensated for by the combination of the DCFs 124a–124n and the FBGs 126a–126n in the same manner as explained previously for the small DCFs 44b–44n and the FBGs 46a–46n in the dispersion slope compensating arrangement 40 of FIG. 5. If the first band-pass filter 122 only allows one group of wavelength channels to pass through, then a reflector can be used after the DCF 124a instead of the FBG 126a to reflect the signal back to Port B. The second and third band-pass filters 132 and 142 each allow separate specific groups of wavelength channels to pass and reflects the rest. Therefore, using multiple band-pass filters 122, 132, and 142 allows for dispersion slope compensation on a group per group basis, and each group of wavelength channels will go through the same number of reflections (via the FBGs) and transmissions (twice via the DCFs). In other words, each group of wavelength channels will have the same amount of power loss. If the band separation becomes small, the optical dispersion slope compensating arrangement 70 of FIG. 7 can be used in combination with the optical dispersion slope compensating arrangement 110 of FIG. 8.

In summary, four different optical dispersion compensating designs are shown in FIGS. 5–8 that are based on the basic design of FIG. 1 to cope with different applications and problems. It is possible to build different optical dispersion compensators by using different combinations of the arrangements shown in FIGS. 1 and 5–8 as is described, for example, for a combination of the optical dispersion slope compensating arrangements 70 and 110.

It is to be appreciated and understood that the specific embodiments of the invention described hereinabove are merely illustrative of the general principles of the invention. Various modifications may be made by those skilled in the art which are consistent with the principles set forth.

What is claimed is:

1. An optical arrangement for providing optical dispersion slope compensation to a received dispersion distorted input signal comprising N×M wavelength multiplexed channels, the arrangement comprising:

a plurality of fiber Bragg gratings (FBGs) serially coupled along an optical fiber, each of the plurality of FBGs being arranged to reflect a separate one of N groups of the M×N wavelength multiplexed channels back along the optical fiber for providing a dispersion slope compensating value to each of the N groups of the M×N wavelength multiplexed channels;

a major dispersion compensating fiber (DCF) for providing a predetermined chromatic dispersion correction value to the N×M wavelength multiplexed channels, the combination of the dispersion compensation values provided by the plurality of FBGs and the dispersion correction values provided by the major DCF being used to generate a dispersion slope compensated output signal wherein a residual dispersion for the N groups of wavelength channels after propagating through the major DCF has a linear slope and a first one of the N groups of wavelength channels has a zero dispersion value after reflection by a first FBG; and first directing means for directing the N×M wavelength multiplexed channels to and from the plurality of FBGs and for directing the N×M wavelength multiplexed channels to or from the major DCF.

2. The optical arrangement of claim 1 wherein each of the plurality of FBGs comprises a separate predetermined amount of chirp which provides a predetermined amount of dispersion compensation to the corresponding separate one of the N groups of the M×N wavelength multiplexed channels reflected by that FBG.

3. The optical arrangement of claim 1 wherein the first directing means comprises a first port, a second port, and a third port, the first port being coupled to receive the M×N wavelength multiplexed channels and direct the M×N wavelength multiplexed channels to the second port, the second port being coupled to provide the M×N wavelength multiplexed channels to the serial arrangement of the plurality of FBGs and direct the reflected M×N wavelength multiplexed channels to the third port, the third port being coupled to an output of the optical arrangement, the major DCF being coupled to any one of the first, second and third ports of the first directing means.

4. The optical arrangement of claim 1 wherein each of the plurality of FBGs are serially formed in a predetermined sequence along a single piece of the optical fiber thereby avoiding insertion losses from alternately spliced FBGs and optical fiber sections.

5. The optical arrangement of claims 1 further comprising a plurality of small DCFs alternately coupled with the plurality of FBGs along the optical fiber, each of the plurality of small DCFs providing a predetermined amount of dispersion compensation to each of the N groups of the M×N wavelength multiplexed channels passing therethrough in either direction along the optical fiber such that cumulative dispersion compensations to each of the N groups of the M×N wavelength multiplexed channels generates a substantially zero dispersion value for each of the N groups of the M×N wavelength multiplexed channels in the dispersion slope compensated output signal.

6. The optical arrangement of claim 5 wherein the major DCF introduces a predetermined chromatic dispersion compensation wherein the slope of a response curve for residual dispersion remaining after the chromatic dispersion compensation by the major DCF alone is linear and provides a zero residual dispersion value for a first group of the M×N wavelength multiplexed channels reflected by a first of the plurality of FBGs; and wherein the dispersion compensation provided by each of the plurality of small DCFs is equal to one-half of the dispersion difference between two adjacent groups of the M×N wavelength multiplexed channels.

7. The optical arrangement of claim 1 wherein:

the first directing means comprises a first port, a second port, and a third port, the first port being coupled to receive the M×N wavelength multiplexed channels on an input optical fiber which are then directed by the first directing means to the second port, the second port being coupled to provide the M×N wavelength multiplexed channels to the serial arrangement of the plurality of FBGs along the optical fiber and direct the reflected M×N wavelength multiplexed channels to the third port which is coupled to an output of the first directing means; and the major DCF being coupled to any one of the first, second, and third ports of the first directing means.

8. The optical arrangement of claim 7 further comprising:

a second directing means comprising a first, a second, and a third port, the second port of the second directing means being coupled to the third port of the first directing means via an output optical fiber, and the third port of the second directing means being coupled to an output of the optical arrangement; and a Raman pump laser for generating a Raman pump output signal having a predetermined wavelength which is optically coupled to the first port of the second directing means via a Raman pump optical fiber, the second directing means directing the Raman pump output signal to the second port thereof and back towards the third port of the first directing means and to the major DCF, whereby a counter-propagating Raman pump output signal provides insertion loss compensation to the dispersion slope compensated output signal when propagating in the major DCF.

9. The optical arrangement of claim 1 wherein the wavelength separation in the M×N wavelength multiplexed channels is smaller than an isolation capability of the plurality of FBGs, wherein the major DCF comprises a first major DCF and a second major DCF, and wherein the plurality of FBGs comprise a first plurality of FBGs and a second plurality of FBGs, the optical arrangement further comprising:

a wavelength band separator for directing a first portion of the N groups of the M×N wavelength multiplexed channels to a first output path, and for directing a second portion of the N groups of the M×N wavelength multiplexed channels to a second output path;

a first dispersion compensating device coupled to receive the first portion of the N groups of the M×N wavelength multiplexed channels from the first output path, the first dispersion compensating device comprising:

the first major DCF for providing a predetermined chromatic dispersion correction value to the first portion of the N groups of the M×N wavelength multiplexed channels;

the first plurality of FBGs serially coupled along a first optical fiber, each FBG in the first plurality of FBGs being arranged to reflect a separate one of the first portion of the N groups of the M×N wavelength multiplexed channels back along the first optical fiber for providing a dispersion slope compensating value to each of the groups in the first portion of the N groups of the M×N wavelength multiplexed channels; and said first directing means for providing a first dispersion compensated output signal to an output of the first dispersion compensating device;

a second dispersion compensating device coupled to receive the second portion of the N groups of the M×N wavelength multiplexed channels from the second output path, the second dispersion compensating device comprising:

the second major DCF for providing a predetermined chromatic dispersion correction value to the second portion of the N groups of the M×N wavelength multiplexed channels;

the second plurality of FBGs serially coupled along a second optical fiber, each FBG in the second plurality of FBGs being arranged to reflect a separate one of the second portion of the N groups of the M×N wavelength multiplexed channels back along the second optical fiber for providing a dispersion slope compensating value to each of the groups in the second portion of the N groups of the M×N wavelength multiplexed channels; and said first directing means for providing a second dispersion compensated output signal to an output of the second dispersion compensating device; and a wavelength band combiner for receiving the first and second dispersion compensated output signals from the first and second dispersion compensating devices, respectively, and multiplexing the first and second dispersion compensated output signals to generate an N×M channel multiplexed output signal from the optical arrangement.

10. The optical arrangement of claim 9 wherein each of the first and second dispersion compensating devices further comprise first and second pluralities of small DCFs alternately coupled with the first and second pluralities of FBGs along the first and second optical fibers, respectively, each small DCF providing a predetermined amount of dispersion compensation to each of the corresponding groups of the M×N wavelength multiplexed channels passing therethrough in either direction along the first and second optical fibers such that cumulative dispersion compensations to each of the corresponding groups of the M×N wavelength multiplexed channels generates a substantially zero dispersion value for each of the corresponding groups of the M×N wavelength multiplexed channels in the first and second dispersion compensated output signals from the first and second dispersion compensating devices.

11. The optical arrangement of claim 9 wherein the first directing means in each of the first and second dispersion compensating devices comprises a first port, a second port, and a third port, the first port being coupled to receive the portion of the N groups of the M×N wavelength multiplexed channels from the wavelength band separator and direct the portions of the N groups of the M×N wavelength multiplexed channels to the second port, the second port being coupled to provide the portions of the N groups of the M×N wavelength multiplexed channels to the serial arrangement of the plurality of FBGs and direct the reflected portions of the N groups of the M×N wavelength multiplexed channels to the third port, the third port being coupled to an output of the optical arrangement, the first and second major DCFs being coupled to any one of the first, second, and third ports of the first directing means.

12. The optical arrangement of claim 11 wherein each of the first and second dispersion compensating devices further comprises:

a second directing means comprising a first, a second, and a third port, the second port of the second directing means being coupled to the third port of the first directing means via an output optical fiber, and the third port of the second directing means being coupled to the output of the associated dispersion compensating device; and a Raman pump laser for generating a Raman pump output signal having a predetermined wavelength which is optically coupled to the first port of the second directing means via a Raman pump optical fiber, the second directing means directing the Raman pump output signal to the second port thereof and back towards the third port of the first directing means and to the associated major DCF, whereby a counter-propagating Raman pump output signal provides insertion loss compensation to the dispersion slope compensated output signal when propagating in the associated major DCF.

13. The optical arrangement of claim 9 wherein:

each of the wavelength band separator and the wavelength band combiner comprise a 50:50 power splitter, the power splitter directing all of the portions of the N groups of the M×N wavelength multiplexed channels along both the first and second output paths;

the first dispersion compensating device further comprises a plurality of filters, each filter passing only a separate one of the first portion of the N groups of the M×N wavelength multiplexed channels from the first path from the power splitter for dispersion compensating processing by the first major DCF and the first plurality of FBGs in the first dispersion compensating device; and the second dispersion compensating device further comprises a plurality of filters, each filter passing only a separate one of the second portion of the N groups of the M×N wavelength multiplexed channels from the second path from the power splitter for dispersion compensating processing by the second major DCF and the second plurality of FBGs in the second dispersion compensating device.

14. The optical arrangement of claim 1 wherein:

the plurality of FBGs are divided into at least two subgroups with each subgroup of FBGs being serially coupled along a separate associated optical fiber, each FBG being arranged to reflect a separate one of the N groups of the M×N wavelength multiplexed channels back along the corresponding separate associated optical fiber, the combination of the major DCF and the at least two subgroups of FBGs having characteristics to substantially eliminate the dispersion found in the M×N wavelength multiplexed channels; and the first directing means is arranged to sequentially direct (a) the M×N wavelength multiplexed channels to the first subgroup of FBGs, (b) the reflected M×N wavelength multiplexed channels from the first subgroup of FBGs sequentially to each of the remaining at least two subgroups of FBGs, and (c) the reflected M×N wavelength multiplexed channels from a last one of the at least two subgroups of FBGs to the major DCF for providing dispersion compensation to the N×M wavelength multiplexed channels, and then directthe dispersion compensated output signal for the N×M wavelength multiplexed channels to an output of the optical arrangement.

15. The optical arrangement of claim 14 wherein:

the first directing means comprises at least four ports, a first port being coupled to receive the M×N wavelength multiplexed channels on an input optical fiber which are then directed by the first directing means to a second port, the second port being coupled to provide the M×N wavelength multiplexed channels to the serial arrangement of the first subgroup of FBGs along a first separate associated optical fiber and direct the reflected M×N wavelength multiplexed channels to a third port, the third port being coupled to provide the M×N wavelength multiplexed channels to the serial arrangement of the second subgroup of FBGs along a second separate associated optical fiber and direct the reflected M×N wavelength multiplexed channels serially through any other subgroups of the at least two subgroups of serially coupled FBGs via interim third ports of the first directing means, and then to the at least fourth port which is coupled to an output of the first directing means; and the major DCF is coupled to any one of the first port and the at least fourth port of the first directing means.

16. The optical arrangement of claim 15 further comprising:
   a second directing means comprising a first, a second, and a third port, the second port of the second directing means being coupled to the at least fourth port of the first directing means via an output optical fiber, and the third port of the second directing means being coupled to the output of the optical arrangement; and
   a Raman pump laser for generating a Raman pump output signal having a predetermined wavelength which is optically coupled to the first port of the second directing means via a Raman pump optical fiber, the second directing means directing the Raman pump output signal to the second port thereof and back towards the at least fourth port of the first directing means and to the major DCF, whereby a counter-propagating Raman pump output signal provides insertion loss compensation to the dispersion slope compensated output signal when propagating in the major DCF.

17. An optical arrangement for providing optical dispersion slope compensation to a received dispersion distorted input signal comprising N×M wavelength multiplexed channels, the optical arrangement comprising:
   first directing means comprising:
      a first port coupled to receive the input signal on a first optical fiber;
      a second port coupled to a second optical fiber; and
      a third port coupled to a third optical fiber that provides a dispersion compensating output signal from the optical arrangement, wherein the first directing means directs the input signal from the first port to the second port for propagation along the second port for propagation along the second optical fiber, and then directs a signal returning on the second optical fiber to the third port for propagation on the third optical fiber;
   a plurality of fiber Bragg gratings (FBGs) serially formed along the second optical fiber, each of the plurality of FBGs being arranged to reflect a separate one of N groups of the M×N wavelength multiplexed channels back along the second optical fiber towards the second port of the first directing means for providing a dispersion compensating value for each of the N groups of the M×N wavelength multiplexed channels; and
   a major dispersion compensating fiber (DCF) coupled to any one of the first, second, and third optical fibers for providing a predetermined overall dispersion correction value to all of the N×M wavelength multiplexed channels, the combination of the dispersion compensating values provided by the plurality of FBGs and the dispersion correction values provided by the major DCF generating a dispersion slope compensated output signal wherein a residual dispersion for the N groups of wavelength channels after propagating through the major DCF has a linear slope and a first one of the N groups of wavelength channels has a zero dispersion value after reflection by a first FBG.

18. The optical arrangement of claim 17 wherein each of the plurality of FBGs comprises a separate predetermined amount of chirp which provides a predetermined amount of dispersion compensation to the corresponding separate one of the N groups of the M×N wavelength multiplexed channels reflected by that FBG, the combination of the dispersion correction provided by the major DCF and each of the plurality of FBGs generating a substantially zero dispersion value for each of the N groups of the M×N wavelength multiplexed channels in the dispersion slope compensated output signal.

19. The optical arrangement of claim 17 further comprising a plurality of small DCFs alternately coupled with the plurality of FBGs along the second optical fiber, each of the plurality of small DCFs providing a predetermined amount of dispersion compensation to each of the N groups of the M×N wavelength multiplexed channels passing therethrough in either direction along the optical fiber such that cumulative dispersion compensations to each of the N groups of the M×N wavelength multiplexed channels generates a substantially zero dispersion value for each of the N groups of the M×N wavelength multiplexed channels in the dispersion slope compensated output signal.

20. The optical arrangement of claim 19 wherein the slope of a response curve for residual dispersion remaining after the dispersion compensation by the major DCF alone is linear and provides a zero residual dispersion value for a first group of the M×N wavelength multiplexed channels reflected by a first of the plurality of FBGs, and the dispersion compensation provided by each of the plurality of small DCFs is equal to one-half of the dispersion difference between two adjacent groups of the M×N wavelength multiplexed channels.

21. The optical arrangement of claim 19 further comprising:
   a second directing means comprising a first, a second, and a third port, the second port of the second directing means being coupled to the third port of the first directing means via the third optical fiber, and the third port of the second directing means being coupled to an output of the optical arrangement; and
   a Raman pump laser for generating a Raman pump output signal having a predetermined wavelength which is optically coupled to the first port of the second directing means via a Raman pump optical fiber, the second directing means directing the Raman pump output signal to the second port thereof and back along the third optical fiber towards the third port of the first directing means and to the major DCF, whereby a counter-propagating Raman pump output signal in the third optical fiber provides insertion loss compensation to the dispersion slope compensated output signal when propagating in the major DCF.

22. The optical arrangement of claim 17 wherein the wavelength separation in the M×N wavelength multiplexed channels is smaller than an isolation capability of the plurality of FBGs, wherein the major DCF comprises a first major DCF and a second major DCF, wherein the plurality of FBGs comprise a first plurality of FBGs and a second plurality of FBGs, and wherein the first directing means comprises a first dispersion compensating device directing means and a second dispersion compensating device directing means, the optical arrangement further comprising:
   a wavelength band separator for directing a first portion of the N groups of the M×N wavelength multiplexed channels to a first output path, and for directing a second portion of the N groups of the M×N wavelength multiplexed channels to a second output path;
   a first dispersion compensating device coupled to receive the first portion of the N groups of the M×N wavelength multiplexed channels from the first output path, the first dispersion compensating device comprising:
      the first dispersion compensating device directing means comprising:

said first port coupled to receive the first portion of the N groups of the M×N wavelength multiplexed channels;

said second port, coupled to a second optical fiber; and said third port coupled to a third optical fiber coupled to an output of the second dispersion compensating device, the first dispersion compensating device directing means directing the first portion of the N groups of the M×N wavelength multiplexed channels from the first port to the second port for propagation along the second optical fiber, and then directing a signal returning on the second optical fiber to the third port for propagation on the third optical fiber;

the first plurality of FBGs serially formed along the second optical fiber, each FBG in the first plurality of FBGs being arranged to reflect a separate one of the first portion of the N groups of the M×N wavelength multiplexed channels back along the second optical fiber towards the second port of the first dispersion compensating device directing means for providing a determined dispersion compensating value; and the first major DCF coupled to any one of the first, second, and third optical fibers for providing a predetermined overall dispersion correction value to the first portion of the N groups of the M×N wavelength multiplexed channels;

a second dispersion compensating device coupled to receive the second portion of the N groups of the M×N wavelength multiplexed channels from the second output path, the second dispersion compensating device comprising:

the second dispersion compensating device directing means comprising:

a first port coupled to receive the second portion of the N groups of the M×N wavelength multiplexed channels;

a second port, coupled to a second optical fiber; and a third port coupled to a third optical fiber coupled to an output of the second dispersion compensating device, the second dispersion compensating device directing means directing the second portion of the N groups of the M×N wavelength multiplexed channels from the first port to the second port for propagation along the second optical fiber, and then directing a signal returning on the second optical fiber to the third port for propagation on the third optical fiber;

the second plurality of FBGs serially formed along the second optical fiber, each FBG in the second plurality of FBGs being arranged to reflect a separate one of the first portion of the N groups of the M×N wavelength multiplexed channels back along the second optical fiber towards the second port of the second dispersion compensating device directing means for providing a predetermined dispersion compensating value; and the second major DCF coupled to any one of the first, second, and third optical fibers for providing a predetermined overall dispersion correction value to the second portion of the N groups of the M×N wavelength multiplexed channels; and a wavelength band combiner for receiving the first and second dispersion compensated output signals from the first and second dispersion compensating devices, respectively, and multiplexing the first and second dispersion compensated output signals to generate a dispersion compensated output signal for the N×M multiplexed channels from the optical arrangement.

23. The optical arrangement of claim 22 wherein each of the first and second dispersion compensating devices further comprises first a second pluralities of small DCFs alternately coupled with the first and second pluralities of FBGs, each small DCF providing a predetermined amount of dispersion compensation to each of the corresponding groups of the M×N wavelength multiplexed channels passing therethrough in either direction along the first and second optical fibers such that cumulative dispersion compensations to each of the groups of the M×N wavelength multiplexed channels generates a substantially zero dispersion value for each of the corresponding groups of the M×N wavelength multiplexed channels in the first and second dispersion compensated output signal output signals from the first and second dispersion compensating devices.

24. The optical arrangement of claim 23 wherein each of the first and second dispersion compensating devices further comprises:

a second directing means comprising a first, a second, and a third port, the second port of the second directing means being coupled to the third port of the first directing means via the third optical fiber, and the third port of the second directing means being coupled to an output of the associated dispersion compensating device; and a Raman pump laser for generating a Raman pump output signal having a predetermined wavelength which is optically coupled to the first port of the second directing means via a Raman pump optical fiber, the second directing means directing the Raman pump output signal to the second port thereof and back along the third optical fiber towards the third port of the first directing means and the associated major DCF, whereby a counter-propagating Raman pump output signal in the third optical fiber provides insertion loss compensation to the dispersion slope compensated output signal when propagating in the associated major DCF.

25. A method of providing optical dispersion slope compensation to a received dispersion distorted input signal comprising N×M wavelength multiplexed channels comprising the steps of:

(a) reflecting a separate one of N groups of wavelength channels back along an optical fiber from a separate one of a plurality of fiber Bragg gratings (FBGs) which are serially coupled along the optical fiber for providing a first dispersion compensating value to each of the N groups;

(b) introducing a predetermined overall second dispersion compensating value to the N×M wavelength multiplexed channels by a major dispersion compensating fiber (DCF);

(c) applying the predetermined overall dispersion compensation value of the major DCF to the N groups of wavelength channels such that a residual dispersion for the N groups of wavelength channels after propagating through the major DCF has a linear slope and a first one of the N groups of wavelength channels has a zero dispersion value after reflection by a first FBG; and (d) generating a dispersion compensated output signal wherein the dispersion in the input signal is substantially eliminated after the N groups of wavelength signals have been reflected by each of the plurality of FBGs in step (a) and have propagated through the major DCF in step (b) to an output.

26. The method of claim 25 comprising the further steps of:
(e) in performing step (a), introducing a separate predetermined chirp by each of the plurality of FBGs into the associated separate one of N groups of wavelength channels being reflected thereby.

27. The method of claim 25 wherein in performing step (a) performing the substeps of:
(a1) each FBG only reflecting a separate one of N groups of wavelength channels back along the optical fiber without introducing dispersion compensation; and
(a2) arranging a plurality of small DCFs alternately with the plurality of FBGs along the optical fiber, each small DCF introducing a predetermined amount of dispersion compensation to a signal passing therethrough in either direction along the optical fiber such that the combination of dispersion compensation provided by each of the major DCF and the plurality of small DCFs substantially eliminate the dispersion found in the input signal.

28. The method of claim 27 comprising the further steps of:
(e) generating a Raman pump output signal having a predetermined wavelength from a Raman pump laser; and
(f) directing the Raman group output signal in a counter-propagating direction through the major DCF of step (b), the counter-propagating Raman pump output signal in the major DCF providing insertion loss compensation in the dispersion compensated output signal.

29. The method of claim 25 wherein in step (a) performing the substeps of:
(a1) dividing the plurality of FBGs into at least two subgroups with each subgroup of FBGs being serially coupled along a separate associated optical fiber, each FBG being arranged for the reflecting a separate one of the N groups of wavelength channels received in the input signal back along the separate associated optical fiber for providing a first dispersion compensating value to each of the N groups;
(a2) directing the received dispersion distorted input signal to a first subgroup of FBGs and then serially to each of the remaining at least two subgroups of FBGs; and
(a3) passing a separate subgroup of the N groups of wavelength channels to each of the at least two subgroups of FBGs using separate bandpass filters.

30. A method of providing optical dispersion slope compensation to a received dispersion distorted input signal comprising N×M wavelength multiplexed channels comprising the steps of:
(a) demultiplexing the N×M wavelength multiplexed channels into a plurality of N groups of M wavelength channels each in a band separator, and directing a first section of the N groups of wavelength channels along a first optical fiber, and directing a second section of the N groups of wavelength channels along a second optical fiber;
(b) directing each of the groups of wavelength channels received in the first and second sections via the first and second optical fibers, respectively, along a respective third and fourth optical fiber;
(c) reflecting a separate one of the groups of wavelength channels back along the third and fourth optical fibers, respectively, from a separate one of a respective first and second plurality of fiber Bragg gratings (FBGs) which are serially coupled along each of the third and fourth optical fibers, respectively, for introducing a separate first dispersion compensating value into each of the groups of wavelength channels in the respective first and second sections;
(d) introducing a predetermined overall separate second dispersion compensating value to the groups of wavelength channels in the first and second sections when propagating through a first and second major dispersion compensating fiber (DCF), respectively;
(e) generating first and second output signals after the groups of wavelength channels in the first and second sections, respectively, have been reflected by predetermined ones of the FBGs in step (c) and propagated through the respective first and second major DCFs in step (d); and
(f) multiplexing the first and second output signals generated in step (e) to generate an output signal comprising the N×M dispersion slop compensated wavelength multiplexed channels.

31. The method of claim 30 wherein in performing step (c) performing the substeps of:
(c1) each FBG in the first and second plurality of FBGs only reflecting a separate one of the groups of wavelength channels in the first and second sections, respectively, back along the respective third and fourth optical fibers without introducing dispersion compensation; and
(c2) arranging a first and second plurality of small DCFs alternately with the first and second plurality of FBGs, respectively, between a first FBG and a last FBG along the respective third and fourth optical fibers, each small DCF introducing a predetermined amount of dispersion compensation to a signal passing therethrough in either direction along the associated third and fourth optical fibers such that the combination of dispersion compensation provided by each of the first and second major DCFs, respectively, and the respective first and second plurality of small DCFs substantially eliminate dispersion found in the groups of wavelength channels in the first and second sections.

32. The method of claim 31 comprising the further steps of:
(g) prior to step (e), generating a first and a second Raman pump output signal having a predetermined wavelength from a first and second Raman pump laser, respectively; and
(h) directing the first and second Raman pump output signals in a counter-propagating direction through the first and second major DCFs, respectively, of step (d), the counter-propagating first and second Raman pump output signals in the first and the second major DCFs, respectively, providing insertion loss compensation in the respective first and second output signals generated in step (e).

33. The method of claim 30 comprising the further steps of:
(g) in performing step (a), demultiplexing the N×M wavelength multiplexed channels into a plurality of N groups of M wavelength channels each in a band separator comprising a 50:50 power splitter, and directing both the groups of wavelength channels in the first and sections along a first optical fiber, and directing both the groups of wavelength channels in the first and second sections along a second optical fiber;

(h) in performing step (b), directing both of the groups of wavelength channels in the first and section sections received via the first and second optical fibers, respectively, along a respective third and fourth optical fiber;

(i) in performing step (c), reflecting a separate one of the groups of wavelength channels in the first and second sections back along the third and fourth optical fibers from a separate one of a first and second plurality of fiber Bragg gratings (FBGs), respectively, which are serially coupled along each of the third and fourth optical fibers, respectively, for introducing a separate first dispersion compensating value into each of the groups of wavelength channels in the first and second sections;

(j) prior to performing step (d), filtering the channels received in the first and second section from the third and fourth optical fibers so that only the groups of wavelength channels in the first section from the third optical fiber are passed for processing in step (d), and only the groups of wavelength channels in the second section from the fourth optical fiber are passed for processing in step (d); and (k) in performing step (d), introducing a predetermined overall separate second dispersion compensating value to the groups of wavelength channels in the first and second sections, respectively, from each of the respective third and fourth optical fibers when propagating through a first and second major dispersion compensating fiber (DCF), respectively.

\* \* \* \* \*